(12) United States Patent
Park

(10) Patent No.: US 10,051,271 B2
(45) Date of Patent: *Aug. 14, 2018

(54) CODING STRUCTURE

(71) Applicant: UNIVERSITY-INDUSTRY COOPERATION GROUP OF KYUNG HEE UNIVERSITY, Yongin-Si, Gyeonggi-Do (KR)

(72) Inventor: Gwang Hoon Park, Sungnam-si (KR)

(73) Assignee: UNIVERSITY-INDUSTRY COOPERATION GROUP OF KYUNG HEE UNIVERSITY, Yongin-Si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/161,238

(22) Filed: May 21, 2016

(65) Prior Publication Data

US 2016/0269728 A1   Sep. 15, 2016

Related U.S. Application Data

(63) Continuation of application No. 14/525,089, filed on Oct. 27, 2014, which is a continuation of application No. 14/021,985, filed on Sep. 9, 2013, now Pat. No. 8,891,891, which is a continuation of application No. 12/707,447, filed on Feb. 17, 2010, now Pat. No. 8,532,408.

(51) Int. Cl.
*G06K 9/36* (2006.01)
*G06K 9/46* (2006.01)
(Continued)

(52) U.S. Cl.
CPC ......... *H04N 19/119* (2014.11); *H04N 19/137* (2014.11); *H04N 19/139* (2014.11);
(Continued)

(58) Field of Classification Search
None
See application file for complete search history.

(56) References Cited

U.S. PATENT DOCUMENTS 5,021,891 A    6/1991  Lee
8,290,058 B2  10/2012  Amon et al.
(Continued)

FOREIGN PATENT DOCUMENTS

JP    05-506340 A    9/1993
JP    11-146396 A    5/1995
(Continued)

OTHER PUBLICATIONS

H.264 and MPEG-4 Video compression, Video coding for next generation multimedia, by Iain E. G. Richardson, The Robert Gordon University, Aberdeen, UK, Wiley.*
(Continued)

*Primary Examiner* — Vikkram Bali

(57) ABSTRACT

Apparatuses and techniques relating to encoding a video are provided. An encoding device includes a motion coding module configured to determine a coding block level for processing an image data, and further configured to determine a block formation for a motion coding of the image data according to the coding block level; and a texture coding module configured to determine a block size for a texture coding of the image data according to the block formation to thereby generate a coded bit stream.

20 Claims, 11 Drawing Sheets

(51) Int. Cl.
   *H04N 19/119*   (2014.01)
   *H04N 19/176*   (2014.01)
   *H04N 19/147*   (2014.01)
   *H04N 19/137*   (2014.01)
   *H04N 19/139*   (2014.01)
   *H04N 19/50*    (2014.01)
   *H04N 19/51*    (2014.01)
   *H04N 19/513*   (2014.01)

(52) U.S. Cl.
   CPC ......... *H04N 19/147* (2014.11); *H04N 19/176* (2014.11); *H04N 19/50* (2014.11); *H04N 19/51* (2014.11); *H04N 19/513* (2014.11)

(56) References Cited

U.S. PATENT DOCUMENTS

| | | | |
|---|---|---|---|
| 2006/0078053 A1 | 4/2006 | Park et al. | |
| 2009/0067502 A1* | 3/2009 | Jeon .................... | H04N 19/105 375/240.16 |
| 2013/0279578 A1 | 10/2013 | Moriya et al. | |

FOREIGN PATENT DOCUMENTS

| | | |
|---|---|---|
| JP | 2003-250161 A | 9/2003 |
| JP | 2003-259377 A | 9/2003 |
| JP | 2010-010950 A | 1/2010 |
| WO | 91/13514 A1 | 9/1991 |
| WO | 2007/034918 A1 | 3/2007 |

OTHER PUBLICATIONS

International Search Report and Written Opinion for International Patent Application No. PCT/KR2010/008894 dated Mar. 29, 2011.
Wiegand, T. et al., "Overview of the H.264/AVC video coding standard," IEEE Transactions on Circuits and Systems for Video Technology, vol. 13, No. 7, pp. 560-576, Jul. 2003.
Ma S. et al, "High-definition Video Coding with Super-macroblocks," Conference on Visual Communications and Image Processing (VCIP) in the IS&T/SPIE Symposium on Electronic Imaging, San Jose, California, USA, Jan. 28, 2007.

* cited by examiner

CODING STRUCTURE

CROSS-REFERENCE TO RELATED APPLICATIONS

This patent application is a continuation application under 35 U.S.C. § 120 of U.S. patent application Ser. No. 14/525,089, filed on Oct. 27, 2014, which is a continuation application under 35 U.S.C. § 120 of U.S. patent application Ser. No. 14/021,985, filed on Sep. 9, 2013, now U.S. Pat. No. 8,891,891, issued on Nov. 18, 2014, which is a continuation application under 35 U.S.C. § 120 of U.S. patent application Ser. No. 12/707,447, filed on Feb. 17, 2010, now U.S. Pat. No. 8,532,408, issued on Sep. 10, 2013. The foregoing U.S. patent application Ser. No. 14/525,089, U.S. patent application Ser. No. 14/021,985, and U.S. patent application Ser. No. 12/707,447 are incorporated herein by reference.

BACKGROUND

Recently, due to consumer demand for immersive sensations and technology innovation of displays, huge wall-sized TVs (about 70-120 inches), so-called UDTV (Ultra Definition TV), have drawn much attention in the industry. Typically, the UDTV has a relatively ultra-high resolution which is, e.g., 3840 pixels×2160 lines (4K-UDTV) or 7680 pixels× 4320 lines (8K-UDTV), and requires a huge amount of bandwidth to transmit UDTV video through a communication medium (wired/wireless) or broadcasting line. Such a large bandwidth or a large block of data for coding the UDTV video may increase the likelihood of motion mismatch, resulting in creating an excessive amount of coded data, while increasing the efficiency of spatial and temporal coding of the UDTV video. Thus, there is an interest in developing adaptive coding schemes having an optimized variable block size for coding the UDTV video.

SUMMARY

Techniques relating to encoding a UDTV video are provided. In one embodiment, an encoding device includes a motion coding module configured to determine a coding block level for processing an image data, and further configured to determine a block formation for a motion coding of the image data according to the coding block level; and a texture coding module configured to determine a block size for a texture coding of the image data according to the block formation to thereby generate a coded bit stream.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
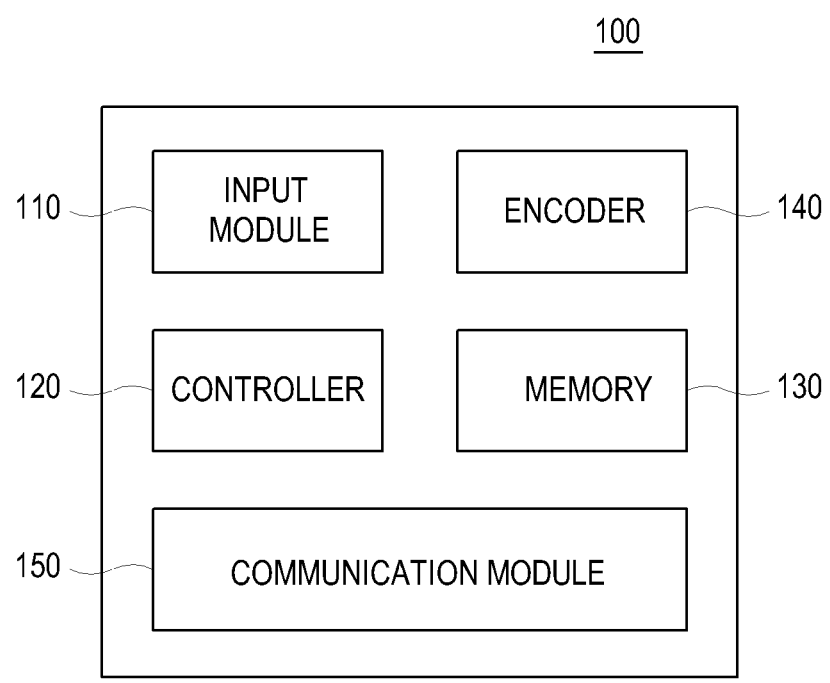
FIG. 1 shows a schematic block diagram of an illustrative embodiment of an image processing device.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

It is to be understood that apparatus and method according to the illustrative embodiments of the present disclosure may be implemented in various forms including hardware, software, firmware, special purpose processors, or a combination thereof. For example, one or more example embodiments of the present disclosure may be implemented as an application having program or other suitable computer-executable instructions that are tangibly embodied on at least one computer-readable media such as a program storage device (e.g., hard disk, magnetic floppy disk, RAM, ROM, CD-ROM, or the like), and executable by any device or machine, including computers and computer systems, having a suitable configuration. Generally, computer-executable instructions, which may be in the form of program modules, include routines, programs, objects, components, data structures, etc. that perform particular tasks or implement particular abstract data types. The functionality of the program modules may be combined or distributed as desired in various embodiments. It is to be further understood that, because some of the constituent system components and process operations depicted in the accompanying figures can be implemented in software, the connections between system units/modules (or the logic flow of method operations) may differ depending upon the manner in which the various embodiments of the present disclosure are programmed.

FIG. 1 shows a schematic block diagram of an illustrative embodiment of an image processing device 100. In one embodiment, image processing device 100 may include an input module 110 that may receive input videos, each video having at least one image frame captured by an image capturing device (not shown), such as a camera, a camcorder or the like. Input module 110 may transform the image frame or frames of a received video into digital image data. Input module 110 may use any of a variety of well-known data processing techniques, such as analog to digital conversion, quantization or the like to transform an image frame(s) of a video into digital image data. The digital image data may represent features of the image frames, such as intensity, color, luminance, or the like, at various pixel locations of the image frames.

In some embodiments, input module 110 may optionally include an interface (not shown). The interface may allow an operator of image processing device 100 to enter or input instructions. Some non-limiting types of instructions that may be entered via the interface may include instructions to receive a video or videos as input, instructions to display a previously input video, instructions to display one or more operational results, or instructions to otherwise operate image processing device 100. Examples of suitable interfaces include but are not limited to a keypad, a keyboard, a mouse, a touch pad, a touch screen, a pointing device, a trackball, a light pen, a joystick, a speech recognition device, a stylus device, an eye and head movement tracker, a digitizing tablet, a barcode reader, or the like.

Image processing device 100 may further include a controller 120 that is configured to control the operations of the components or units/modules of image processing device 100. Controller 120 may operate input module 110 to receive videos having image frames from one or more image capturing devices (e.g., a camera, a camcorder or the like) according to a predetermined processing sequence/flow. In one embodiment, controller 120 may include processors, microprocessors, digital signal processors (DSPs), microcontrollers, or the like. Controller 120 may include at least one embedded system memory to store and to operate software applications, including an operating system, at least one application program, and other program modules. Controller 120 facilitates the running of a suitable operating system configured to manage and to control the operations of image processing device 100. These operations may include the input and output of data to and from related software application programs/modules. The operating system may provide an interface between the software application programs/modules being executed on controller 120 and, for example, the hardware components of image processing device 100. Examples of suitable operating systems include Microsoft Windows Vista®, Microsoft Windows®, the Apple Macintosh® Operating System ("MacOS"), UNIX® operating systems, LINUX® operating systems, or the like.

Image processing device 100 may further include a memory 130 that may be used to store data (e.g., the digital image data) that is communicated between the components or units/modules of image processing device 100. Various components or units/modules of image processing device 100 may utilize memory 130 (including volatile and non-volatile) for data processing. For example, memory 130 may store digital image data that is acquired via input module 110 for processing by encoder 140. Encoder 140 may retrieve and process the digital image data from memory 130.

Memory 130 may include any computer-readable media, such as a Read Only Memory (ROM), EPROM (Erasable ROM), EEPROM (Electrically EPROM), or the like. In addition, memory 130 may be a removably detachable memory to allow replacement if and/or when necessary (e.g., when becoming full). Thus, memory 130 may also include one or more other types of storage devices, such as a SmartMedia® card, a CompactFlash® card, a MemoryStick®, a MultiMediaCard®, a DataPlay® disc, and/or a SecureDigital® card.

Image processing device 100 may further include an encoder 140. In one embodiment, encoder 140 may process the digital image data generated or produced by input module 110, e.g., the digital image data generated by input module 110 from the image frames captured by an image capturing device such as a camera. For example, as part of the processing of the digital image data, encoder 140 may compress the digital image data through the use of variable-sized coding schemes (e.g., variable-sized motion coding and variable-sized texture coding).

Encoder 140 may further divide the image data into one or more basic processing units (e.g., 64×64 ultra block). Each basic processing unit includes a group of image data that is to be stored and processed as a batch. Encoder 140 may quadrisect each of the basic image processing units into sub-blocks (e.g., 32×32 super block) to determine a coding block level for processing the image data included in each sub-block. The coding block level may be defined as, e.g., a level index that indicates coding information (e.g., a block formation for motion coding, and a block size for texture coding in motion coding techniques that are known in the relevant art) used for encoding the image data. The coding block level may include a super block level, a macro block level, and a medium block level. For each sub-block, encoder 140 may perform motion estimations in more than one unit of the image data in the sub-block to determine a coding block level of the sub-block of image data ("first block level decision"). For example, for a 32×32 super block, encoder 140 may perform a motion estimation in a first unit (e.g., the 32×32 super block) of image data to generate a first metric (e.g., sum of absolute difference (SAD), mean absolute difference (MAD), or mean square error (MSE)) and perform a motion estimation in a second unit (e.g., one of the 16×16 macro blocks in the 32×32 super block) of image data to generate a second metric.

Encoder 140 may still further compare the first and the second metrics to thereby determine whether to process (e.g., compress, encode, or the like) the image data of a sub-block (i.e., 32×32 super block). If encoder 140 determines that the sub-block is not to be processed (e.g., when the second metric is smaller than the first metric), encoder 140 may perform a second block level decision for each of the four 16×16 macro blocks in the sub-block in a similar manner as the above first block level decision. If encoder 140 determines that the sub-block is to be processed (e.g., when the first metric is smaller than or equal to the second metric), encoder 140 may determine a super block level as a coding block level and process the image data in the 32×32 super block.

According to the determined coding block level, encoder 140 may determine a block formation (e.g., 32×32 block formation, 32×16 block formation, 16×32 block formation or the like) for motion coding of the image data in the block for which the block level is determined. The block formation may be defined, e.g., as a type of block that can be used for performing motion coding. Encoder 140 may then determine a block size for texture coding of the image data according to the block formation. Encoder 140 may perform motion coding (e.g., motion estimation, motion compensation, and the like) according to the block formation to thereby output motion information, such as a motion vector, a residual image, a block formation, or the like. Encoder 140 may perform a texture coding such as a Discrete Cosine Transform (DCT) according to the block size to generate a coded bit stream. In some embodiments, encoder 140 may be implemented by software, hardware, firmware or any combination thereof. It should be appreciated that although encoder 140 is depicted as a separate unit from controller 120 in FIG. 1, in some embodiments, encoder 140 may be implemented by one of the applications executed on controller 120.

Image processing device 100 may optionally include a display (not shown) to provide a visual output, such as a video and/or the results of the processing of the digital image data, etc., for viewing, for example, by an operator. The display may include, but is not limited to, flat panel displays, including CRT displays, as well as other suitable output devices. Image processing device 100 may also optionally include other peripheral output devices (not shown), such as a speaker or a printer.

In some embodiments, image processing device 100 may optionally further include a communication module 150. Communication module 150 may transmit the coded bit stream (e.g., texture bit stream) and the motion information to at least one external device (not shown) via a wired or wireless communication protocol. A communication protocol (either wired or wireless) may be implemented by employing a digital interface protocol, such as a serial port, parallel port, PS/2 port, universal serial bus (USB) link, firewire or IEEE 1394 link, or wireless interface connection, such as an infrared interface, BlueTooth®, ZigBee, high-definition multimedia interface (HDMI), high-bandwidth digital content protection (HDCP), wireless fidelity (Wi-Fi), local area network (LAN), wide area network (WAN) or the like. In some embodiments, the communication module 150 may include a modem (not shown) to communicate through mobile communications systems, such as a Global System for Mobile Communications (GSM), Global Positioning System (GPS), Digital Mobile Multimedia (DMB), Code Division Multiple Access (CDMA), High-Speed Down Link Packet Access (HSDPA), Wireless Broadband (Wi-Bro), or the like. It will be appreciated that the connection methods described in the present disclosure are only examples and other methods of establishing a communications link between the devices/computers may be used.

Image processing device 100 of FIG. 1 is only one example of a suitable operating environment and is not intended to be limiting. Other well known computing systems, environments, and/or configurations that may be suitable for the image processing described in the present disclosure include, but are not limited to, personal computers, portable devices such as cellular phones, server computers, hand-held or laptop devices, multiprocessor systems, micro-processor based systems, programmable consumer electronics, network personal computers, mini-computers, mainframe computers, distributed computing environments that include any of the units or devices illustrated in FIG. 1, or the like.

Figure 2:
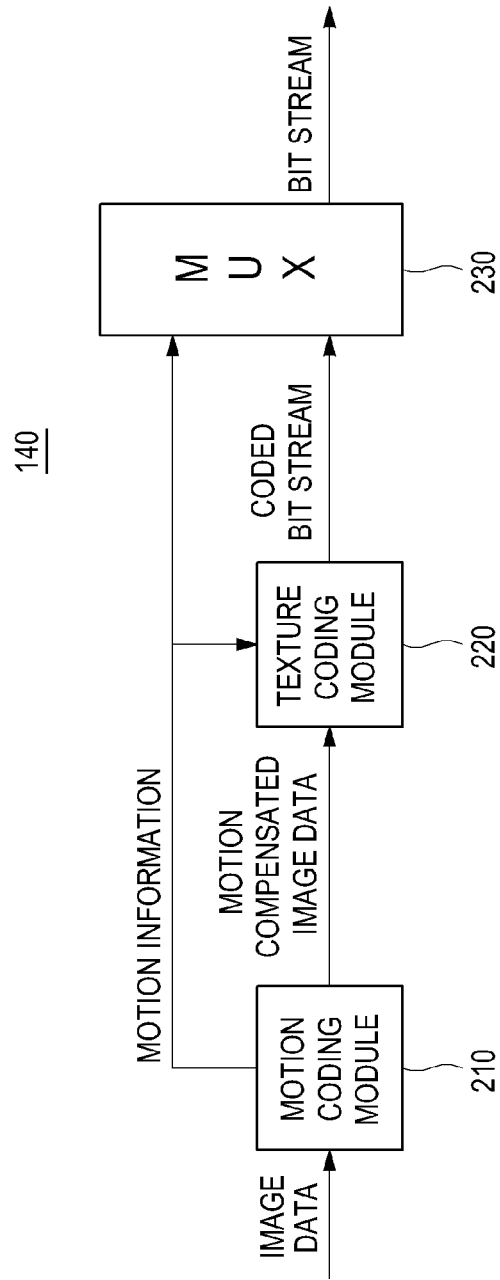
FIG. 2 shows a schematic block diagram of an illustrative embodiment of the encoder illustrated in FIG. 1.

FIG. 2 shows a schematic block diagram of an illustrative embodiment of the encoder 140 illustrated in FIG. 1. In one embodiment, encoder 140 may retrieve from memory 130 digital image data produced or generated from an image frame or frames of a video. Encoder 140 may perform image data compression (e.g., motion coding, texture coding or the like) on the digital image data. As shown in FIG. 2, encoder 140 may include a motion coding module 210 and a texture coding module 220. In some embodiments, encoder 140 may optionally include a multiplexer (MUX) 230. Motion coding module 210 may determine a coding block level for processing the image data, and further determine a block formation for motion coding (e.g., motion estimation, motion compensation, or the like) of the image data according to the coding block level, to thereby generate motion information such as a motion vector. Texture coding module 220 may determine a block size for performing a texture coding (e.g., a DCT) of the motion coded image data according to the block formation to generate a coded bit stream. As depicted, MUX 230 may multiplex the motion information and the coded bit stream to generate a bit stream to be transmitted to a decoder (not shown).

In one embodiment, motion coding module 210 may receive digital image data (e.g., pixel values) from input module 110 and process the digital image data in a unit of image data. For example, motion coding module 210 may divide the digital image data into one or more ultra block having the size of 64×64 (pixels×lines) as a basic image processing unit. Motion coding module 210 may divide the basic image processing unit into one or more sub-blocks such as a 32×32 super block. For example, motion coding module 210 may quadrisect the 64×64 ultra block into four 32×32 super blocks. Motion coding module 210 may determine a coding block level for each of the sub-blocks (e.g., each 32×32 super block) of the basic image processing unit (e.g., 64×64 ultra block). For a 32×32 super block (i.e., each of the four 32×32 super blocks of the 64×64 ultra block), the motion coding module 210 may determine whether the 32×32 super block of image data is to be processed (e.g., compressed, encoded, or the like) at a super block level, in which super block size or macro block size can be used for processing (e.g., texture coding) the image data depending on factors such as a block formation, estimated bit streams, and the like. For example, if the block formation is determined to be a 32×32 block formation, the super block size may be used, or if the block formation is determined to be a 16×32 or 32×16 block formation, the macro block size may be used. For each 32×32 super block, motion coding module 210 is operable to perform a motion estimation (ME) operation on a 32×32 super block unit (the super block-based ME), and one of the four 16×16 macro blocks (i.e., four quadrants of the 32×32 super block) (the macro block-based ME) to generate one or more metrics (e.g., SAD, MAD, MSE) of the super block-based ME and a corresponding metric of the macro block-based ME, respectively. It should be understood that a variety of any ME techniques well-known in the art may be used to perform the super block level decision. Motion coding module 210 may compare the metric of the super block-based ME with the corresponding metric of the macro block-based ME to determine whether the 32×32 super block of image data is to be processed at the super block level. If motion coding module 210 determines that the SAD of the super block-based ME is less than the SAD of the macro block-based ME, motion coding module 210 determines that the 32×32 super block of image data is to be processed at the super block level.

Otherwise, if motion coding module 210 determines that the 32×32 super block is not to be processed at the super block level (e.g., when the SAD of the macro block-based ME is greater than or equal to the SAD of the super block-based ME), motion coding module 210 may further determine whether the 16×16 macro blocks are to be processed. Motion coding module 210 may divide the 32×32 super block into one or more sub-blocks of the 32×32 super block. For example, motion coding module 210 may quadrisect the 32×32 super block into four 16×16 macro blocks. For each 16×16 macro block, the motion coding module 210 may determine whether the macro block of image data is to be processed at a macro block level, in which macro block size or medium block size can be used for processing (e.g., texture coding) the image data depending on factors such as a block formation, estimated bit streams, and the like. For example, if the block formation is determined to be a 16×16 block formation, the macro block size may be used, or if the block formation is determined to be a 8×16 or 16×8 block formation, the medium block size may be used. For each quadrant (16×16 macro block) of the 32×32 super block which is determined not to be processed at the super block level, motion coding module 210 may perform an ME operation on a 16×16 macro block unit (the macro block-based ME), and on a unit of four 8×8 medium blocks (i.e., four quadrants of the 16×16 macro block) (the medium block-based ME) to determine whether the macro block is to be processed at the macro block level. Motion coding module 210 may compare one of the metrics (e.g., SAD) of the macro block-based ME and a corresponding metric of the medium block-based ME. Based on the comparison results, motion coding module 210 may determine whether the coding block level is at a macro block level. If motion coding module 210 determines that the SAD of the macro block-based ME is less than the SAD of the medium block-based ME, motion coding module 210 determines that the macro block is to be processed at a macro block level.

Otherwise, if motion coding module 210 determines that the 16×16 macro block is not to be processed at a macro block level (i.e., the 16×16 macro block should not be processed), motion coding module 210 may further determine the medium blocks are to be processed. Motion coding unit 210 may divide the 16×16 macro block into four 8×8 medium blocks, and for each 8×8 medium block, perform an ME operation on a 8×8 medium block unit, and four 4×4 micro blocks (i.e., four quadrants of the 8×8 macro block) to determine whether the medium block is to be processed. Motion coding module 210 may compare a SAD of the medium block-based ME and a SAD of the micro block-based ME to thereby determine whether the medium block is to be processed either at a medium block level or at a micro block level (i.e. determine whether the 8×8 medium block or 4×4 micro block should be processed). If motion coding module 210 determines that the SAD of the medium block-based ME is less than the SAD of the micro block-based ME, motion coding module 210 determines that the coding block level is at a medium block level. Otherwise, motion coding module 210 determines that the coding block level is at a micro block level.

Figure 3A:
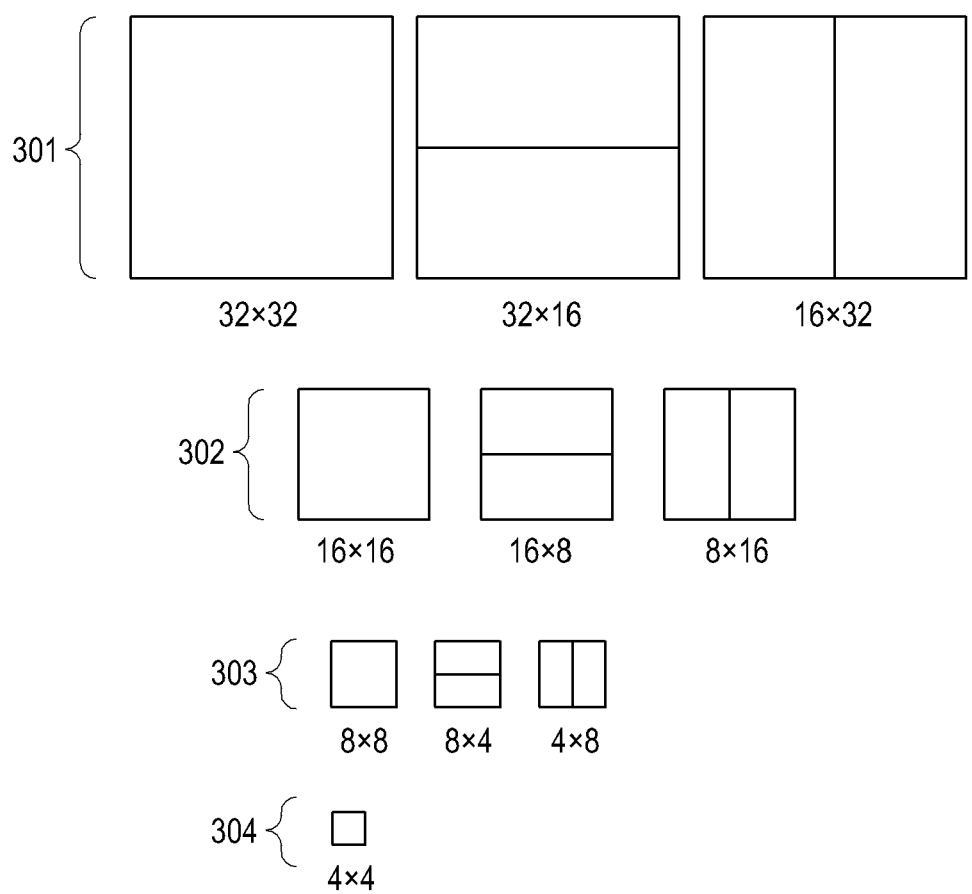
FIGS. 3A and 3B show illustrative embodiments of block formations in coding block levels for a variable-sized motion coding of video image data.

According to the above-determined coding block level, motion coding module 210 may be operable to determine a block formation for a motion coding of the block of image data for which the block level is determined. Each of the coding block levels may be associated with one or more block formations, with which motion coding module 210 may perform a motion coding for image data in the determined block formation. FIG. 3 shows an illustrative embodiment of block formations for respective coding block levels for a variable-sized motion coding of the image data. As depicted in FIG. 3A, (i) a super block level is associated with a group of block formations 301 including three block formations: 32×32, 32×16, and 16×32 block formations; (ii) a macro block level associated with a group of block formations 302 including three block formations: 16×16, 16×8, and 8×16 block formations; (iii) a medium block level associated with a group of block formations 303 including three block formations: 8×8, 8×4, and 4×8 block formations; and (iv) a micro block level associated with a group of block formations 304 including 4×4 block formation. In this way, motion coding module 210 may determine one of the block formations for motion coding of the image data according to the determination of the block levels. For example, if motion coding module 210 determines that the coding block level is at a super block level, then motion coding module 210 may determine the block formation among a 32×32 super block formation, a 32×16 sub-super block formation and a 16×32 sub-super block formation.

Figure 3B:
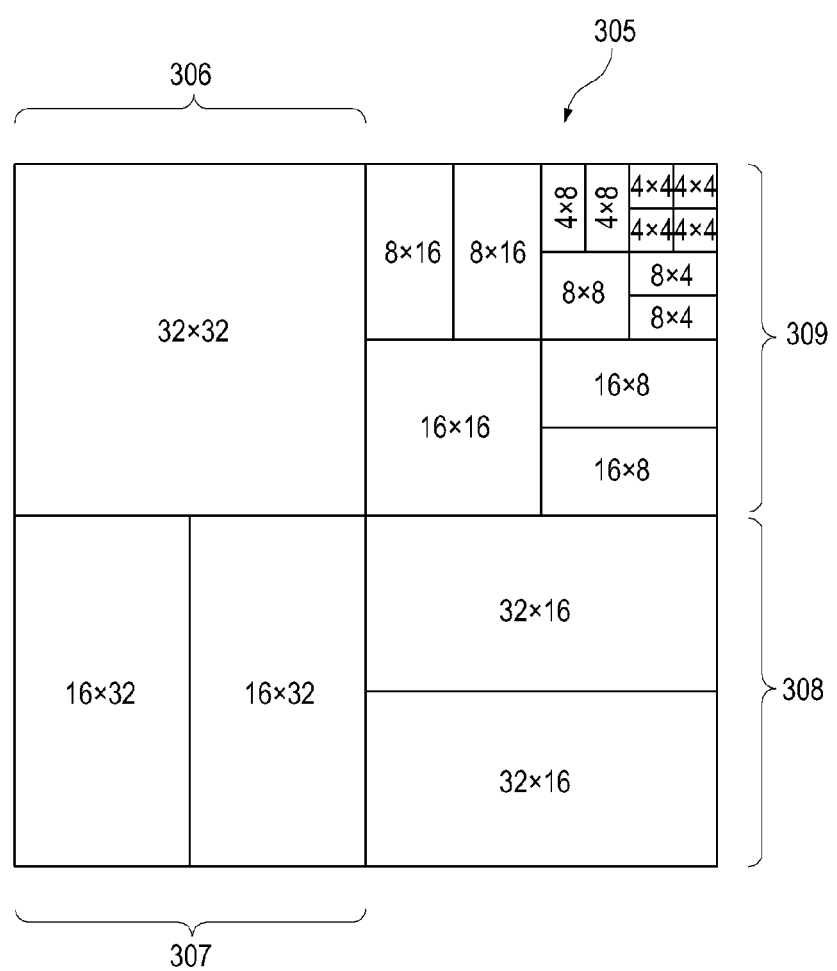

FIG. 3B shows an example of the ultra block to which block formations are mapped according to the block levels determined by motion coding module 210. Motion coding module 210 may determine block levels for sub-blocks of an ultra block 305. For example, motion coding module 210 may determine a left upper quadrant 306, a left lower quadrant 307, and a right lower quadrant 308 of ultra block 305 are at a super block level, and a right upper quadrant 309 is at a block level lower than the super block level. As depicted, based on such determination of the coding block levels, motion coding module 210 determines a 32×32 block formation for left upper quadrant 306 among the block formations included in super block level 301 (FIG. 3A). For left lower quadrant 307 of ultra block 305, motion coding module 210 determines two 16×32 block formations. For right lower quadrant 308 of ultra block 305, motion coding module 210 determines two 32×16 block formations. For right upper quadrant 309 of ultra block 305, motion coding module 210 determines the block formations through the above-described process of the block level decisions. For example, motion coding module 210 may determine a left upper quadrant, a left lower quadrant, and a right lower quadrant of the super block (i.e., right upper quadrant 309) are at a macro block level, and a right upper quadrant is at a block level lower than the macro block level. It should be appreciated that the aforementioned block levels and block formations are only one example and other block levels and block formations that may be used depending on design requirements.

Motion coding module 210 may use any of a variety of well-known motion coding algorithms to estimate and to compensate motions with the image data based on the above-determined coding block level and the block formation. For example, motion coding module 210 may apply the above-determined block formation to perform motion estimation (ME) and motion compensation (MC) algorithms specified in the video-related standards such as MPEG 2, MPEG 4, H.263, H.264 or the like. In this way, motion coding module 210 may be operable to generate motion-compensated image data (e.g., to generate a residual image data) and to output motion information, such as a motion vector, the coding block level, the block formation, and the like, as depicted in FIG. 2.

Figure 4A:
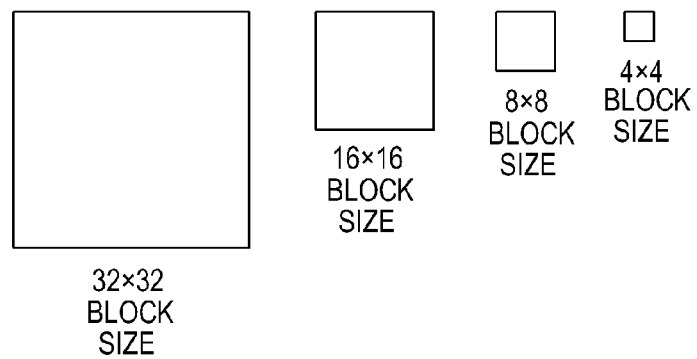
FIGS. 4A and 4B show illustrative embodiments of coding block sizes for a variable-sized texture coding of video image data.

In one embodiment, texture coding module 220 may receive the motion compensated image data and motion information from motion coding module 210 and determine a block size (e.g., a DCT block size) for texture coding (e.g., DCT) of the image data according to the coding block level and the block formation that are determined by motion coding module 201. FIG. 4A shows an illustrative embodiment of coding block sizes for a variable-block sized texture coding of the image data. Depending on the block level and the block formation, texture coding module 220 may select one of the coding block sizes (e.g., 32×32, 16×16, 8×8 and 4×4 DCT blocks) for a variable-sized texture coding of image data.

Figure 5:
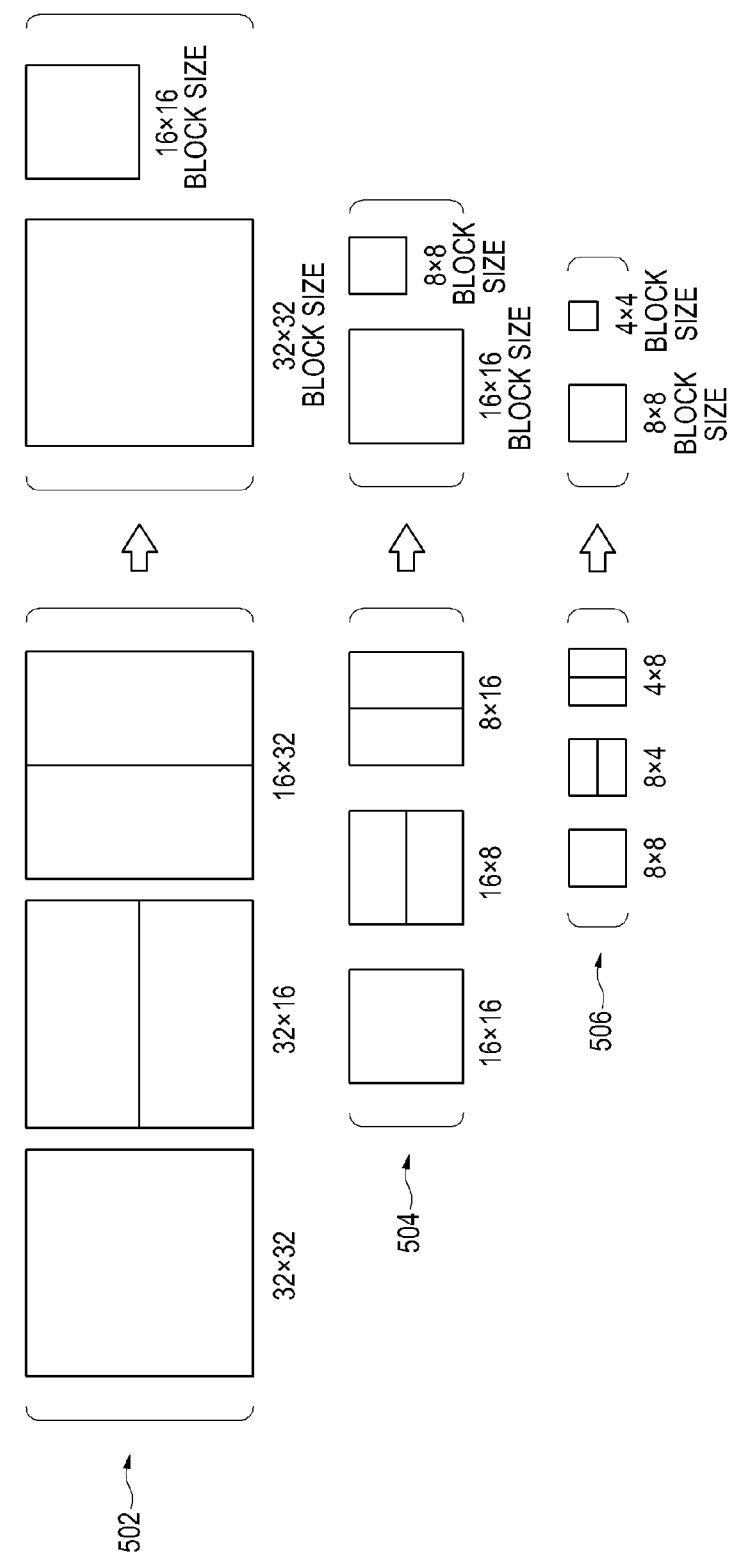
FIG. 5 illustrates an example of the relation between the coding formations of FIG. 3 and the coding block sizes of FIG. 4.

FIG. 5 illustrates an example of the relation between the coding block formations of FIG. 3 and the coding block sizes of FIG. 4A. As depicted, (i) if motion coding module 210 determines that the block level is a super block level, as indicated by 502, texture coding module 220 may select the 32×32 block size (e.g., DCT block size) or the 16×16 block size for texture coding (e.g., a DCT transformation); (ii) if motion coding module 210 determines that the block level is a macro block level, as indicated by 504, texture coding module 220 may select the 16×16 block size or the 8×8 block size; and (iii) if motion coding module 210 determines that the block level is a medium or micro block level, as indicated by 506, texture coding module 220 may select the 8×8 block size or the 4×4 block size.

Texture coding module 220 may determine the coding block size with further reference to the coding formation. When the block level is a super block level, if motion coding module 210 determines that the block formation is a 32×32 super block, then texture coding module 220 determines one of the 32×32 and 16×16 block size for a texture coding (e.g., DCT) of the image data in the 32×32 super block that is determined by motion coding module 210. Otherwise, if motion coding module 210 determines the block formation is a 32×16 or 16×32 sub-super block, texture coding module 220 determines a 16×16 block size for a texture coding. It should be appreciated that reference can be made to the above coding formation to determine the block size for each of the block levels.

Figure 4B:
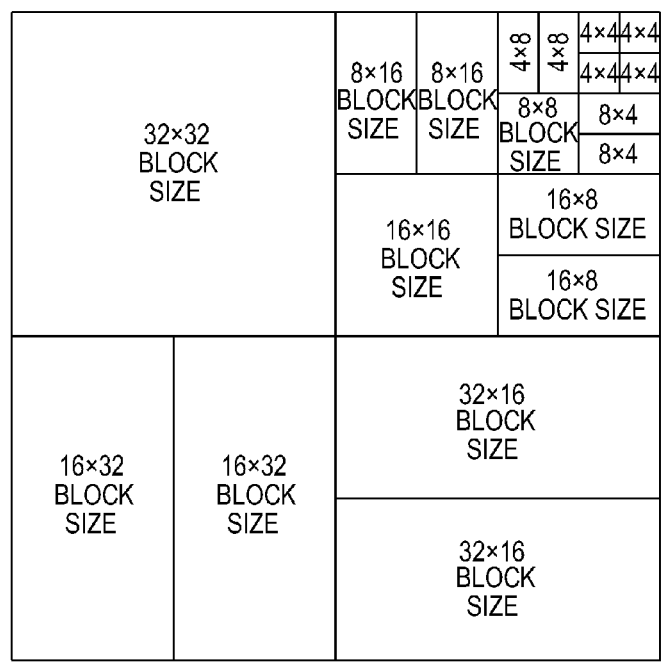

FIG. 4B shows an example of block sizes mapped into an ultra block (e.g., ultra block 305 of FIG. 3B) by applying the relation between the block formations and the block sizes as illustrated in FIG. 5 to the block formations of FIG. 3B. As depicted in FIG. 4B, for left upper quadrant 306 (32×32 block formation) of ultra block 305 in FIG. 3B, 32×32 block size is determined among the candidate block sizes of 32×32 block size and 16×16 block size. For left lower and right lower quadrants 307 and 308 (16×32 block formation and 32×16 block formation respectively) of ultra block 305, a 16×16 block size is determined. For right upper quadrant 309, block sizes are mapped according to each of the 16×16, 16×8, 8×16, 8×8, 8×4, 4×8, 4×4 block formations.

It should be appreciated that texture coding module 220 may use any of a variety of well-known texture coding algorithms to compress the image data (e.g., a residual image data corresponding to a difference between the motion compensated image data in a reference frame and image data in a target frame) using the above-determined block size. For example, texture coding module 220 may apply the above-determined block size to texture coding algorithms specified in the video-related standards such as MPEG 2, MPEG 4, H.263, H.264 or the like.

Figure 6:
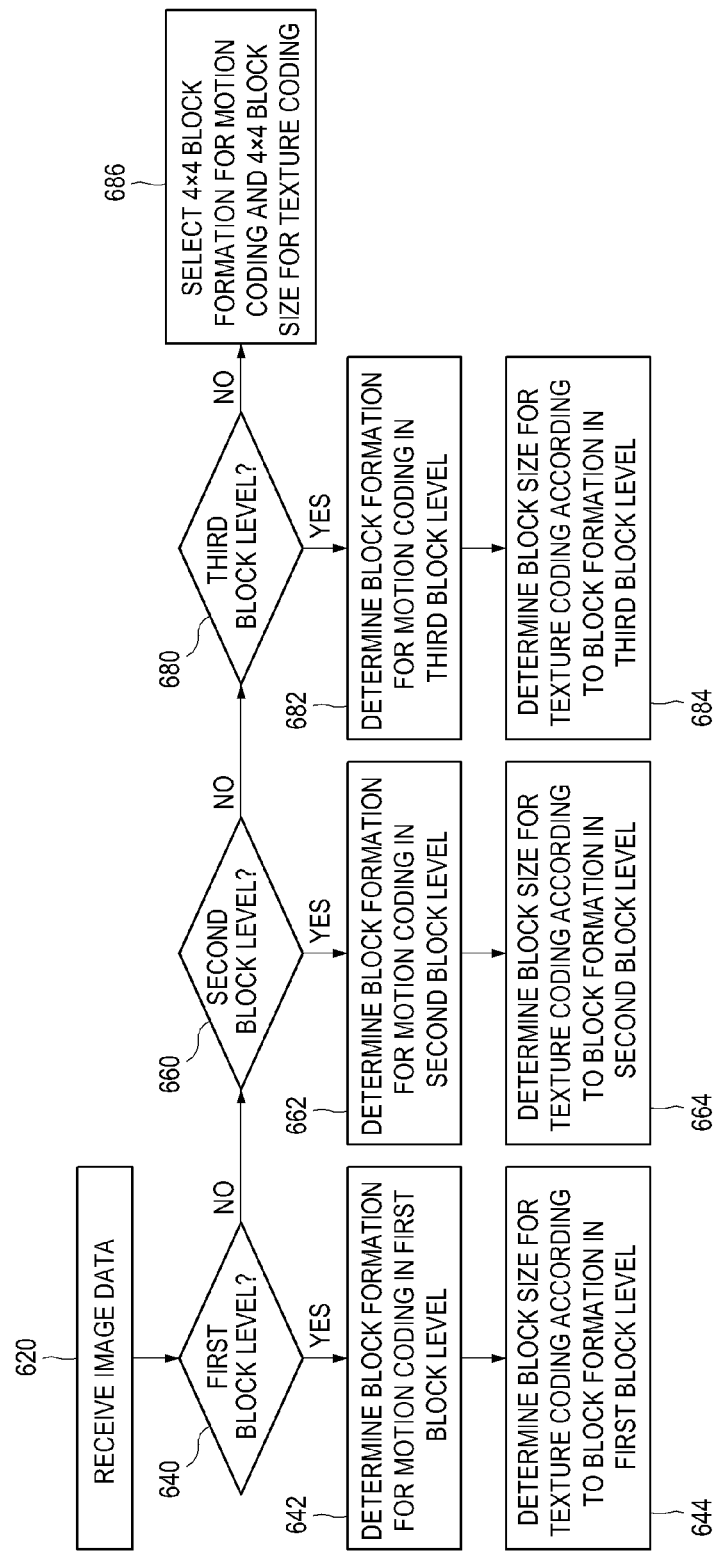
FIG. 6 shows an example flow chart of an illustrative embodiment of a method for determining a coding structure.

Referring to FIGS. 1, 2, 6, 7, 8 and 9, an illustrative embodiment of a method for determining a coding structure is described. FIG. 6 shows an example flow chart of an illustrative embodiment of a method for determining a coding structure. Encoder 140 may receive image data through input module 110 (block 620). Encoder 140 may retrieve from memory 130 digital image data produced or generated from an image frame or frames of a video, e.g., captured using an image capturing device. Motion coding module 210 of encoder 140 may divide the digital image data (e.g., pixel values) into one or more basic image processing units, which is a block of image data to be processed as a group. For example, motion coding module 210 may divide the digital image data into an ultra block unit having the size of 64 pixels×64 lines. Motion coding module 210 may further divide each basic image processing unit into sub-blocks (e.g., 32×32 super blocks).

Motion coding module 210 may perform a first block level decision to determine a coding block level for processing each sub-block (block 640). Motion coding module 210 may determine whether each sub-block (e.g., 32×32 super block that is a quadrant of the 64×64 ultra block) of the basic image processing unit (e.g., 64×64 ultra block) is to be processed at a first block level (e.g., super block level). In one embodiment, for each 32×32 super block, motion coding module 210 may perform an ME operation in a first unit (e.g., in a 32×32 super block unit) to generate one or more metrics (e.g., SAD, MAD, MSE) of the super block-based ME. Motion coding module 210 may perform an ME operation in a second unit (e.g., in a unit of four 16×16 macro blocks) to generate a metric of the macro block-based ME. Motion coding module 210 may compare the metric of the super block-based ME with the corresponding metric of the macro block-based ME. If motion coding module 210 determines that the metric (e.g., SAD) of the super block-based ME is less than the metric of the macro block-based ME, motion coding module 210 determines that the super block is to be processed at a super block level. If motion coding module 210 determines that the super block is to be processed at a super block level, motion coding module 210 proceeds to block 642 to determine a block formation for motion coding of the image data in each of the sub-blocks according to the determined coding block level. Motion coding module 210 may select one of the block formations (e.g., 32×32, 32×16 and 16×32 block formations) included in the first block level (super block level), as shown in FIG. 3A. Texture coding module 220 may determine a block size for texture coding of the image data in each of the sub-blocks according to the block formation determined in block 642 (block 644). Texture coding module 220 may select a 32×32 block size or a 16×16 block size for texture coding (e.g., a DCT transformation), with reference to the relation between the block formations and the block sizes shown in FIG. 5.

If motion coding module 210 determines that the super block is not to be processed at a super block level in block 640 (e.g., when the SAD of the macro block-based ME is greater than the SAD of the super block-based ME), motion coding module 210 proceeds to block 660 to perform a second block level decision to determine whether a coding block level of the image data is a second block level (e.g., macro block level). If motion coding module 210 determines that the coding block level is a macro block level, motion coding module 210 proceeds to block 662 to determine a block formation for motion coding of the image data according to the determined coding block level. Motion coding module 210 may select one of the block formations (16×16, 16×8 and 6×16 block formations) included in the second block level (macro block level), as shown in FIG. 3A. Texture coding module 220 may determine a block size for texture coding of the image data according to the block formation determined in block 662 (block 664). Texture coding module 220 may select the 16×16 block size or the 8×8 block size for texture coding, with reference to the relation shown in FIG. 5.

If motion coding module 210 determines that the macro block is not to be processed at a macro block level in block 660, motion coding module 210 proceeds to block 680 to perform a third block level decision to determine whether a coding block level of the image data is a third block level (e.g., medium block level). If motion coding module 210 determines that the coding block level is a medium block level, motion coding module 210 proceeds to block 682 to determine a block formation for a motion coding of the image data according to the coding block level. Motion coding module 210 may select one of the block formations (16×16, 16×8 and 8×16 block formations) included in the first block level (super block level), as shown in FIG. 3A. Texture coding module 220 may determine a block size for texture coding of the image data according to the block formation determined in block 682 (block 684). Texture coding module 220 may select the 8×8 block size or the 4×4 block size for texture coding, with reference to the relation shown in FIG. 5. If motion coding module 210 determines that the coding block level is not a medium block level in block 680, motion coding module 210 proceeds to block 686 to select a 4×4 block formation for motion coding and texture coding module 220 may select a 4×4 block size for texture coding.

In this way, motion coding module 210 may determine (i) the coding block level among a super block level, a macro block level, and a medium block level; (ii) the block formation for a motion coding of the image data; and (iii) the block size for a texture coding of the image data. Motion coding module 210 may perform a ME operation with the image data in the determined block formation to thereby output motion information such as a motion vector. Texture coding module 220 may perform a texture coding according to the determined block size to generate a coded bit stream. It should be understood that the above-described coding block levels, the block formations, and the block sizes are only one example of formulating a coding structure and is not intended to be limiting. It should be appreciated that although the above coding structure formulation method is described using three coding levels, various coding levels may be considered depending on the implementation/application requirements of the coding format and structure. A variety of coding formations and coding block sizes may be considered for a different coding level. It should be understood that a variety of any ME techniques well-known in the art may be used to perform the block level decisions. It should be also appreciated that the encoder prepared in accordance with the present disclosure may be used in various applications.

Figure 7:
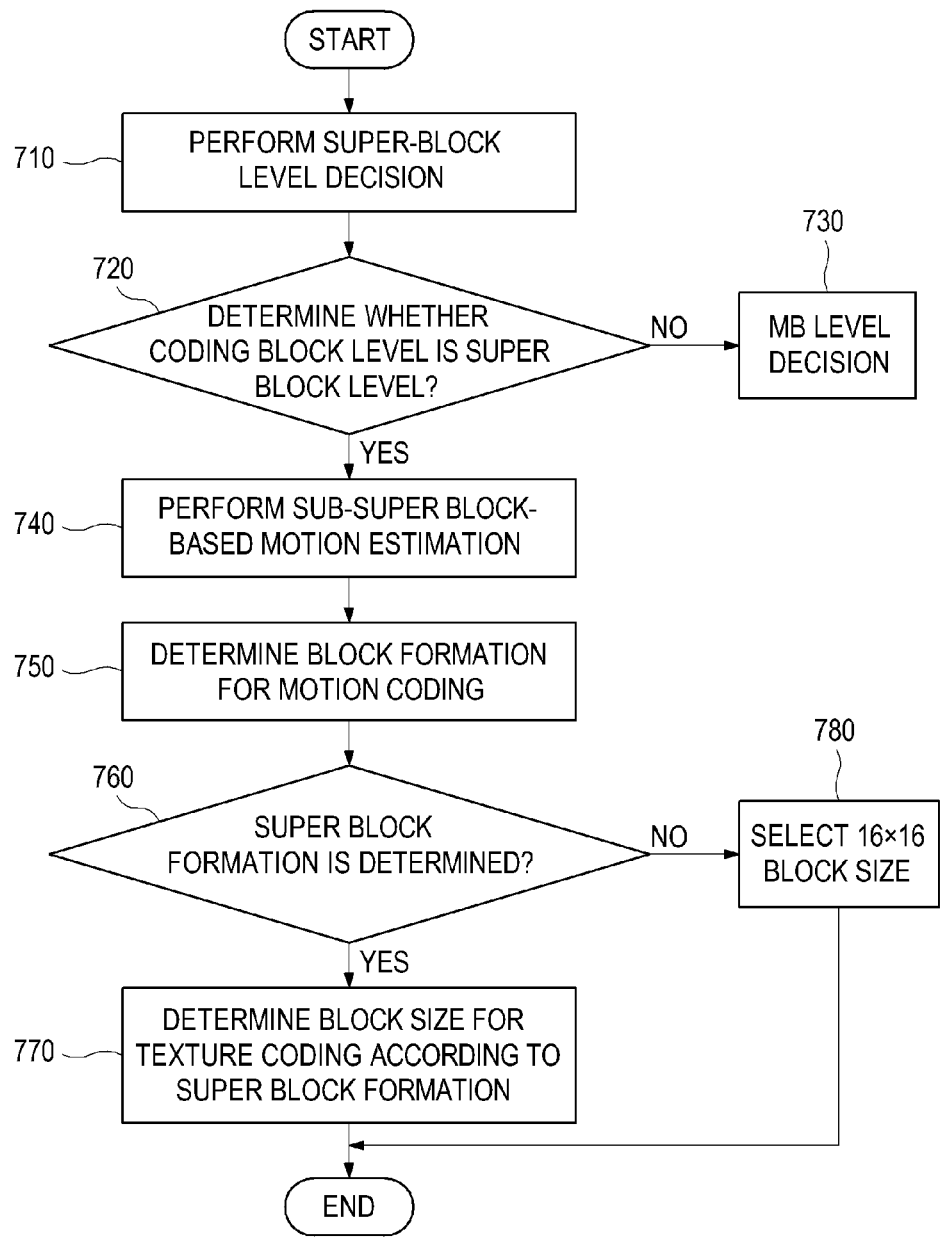
FIG. 7 shows a detailed flow chart of an illustrative embodiment of operations for the first block level decision of FIG. 6.

FIG. 7 shows a detailed flow chart of an illustrative embodiment of operations for the first block level decision of FIG. 6. For each quadrant of the 64×64 ultra block, motion coding module 210 may perform a ME operation in a 32×32 super block unit, and in a unit of four 16×16 macro blocks to determine whether the quadrant (32×32 super block) of the 64×64 ultra block is to be processed at a super block level or not (block 710). Motion coding module 210 may compare one of the metrics (e.g., SAD, MAD, MSE) of the super block-based ME and one of the corresponding metrics of the macro block-based ME, to thereby determine whether the coding block level is at a super block level or not (block 720). If motion coding module 210 determines that the SAD of the super block-based ME is less than the SAD of the macro block-based ME, motion coding module 210 determines that the 32×32 super block is to be processed at a super block level and proceeds to block 740. Otherwise, motion coding module 210 proceeds to block 810 of FIG. 8 to perform the second block level decision of FIG. 6 (block 730).

Motion coding module 210 may perform an ME operation in a unit including two 32×16 sub-super blocks, and in a unit including two 16×32 sub-super blocks, to generate a 32×16 sub-super block-based SAD and a 16×32 sub-super block-based SAD, respectively (block 740). Motion coding module 210 may determine a block formation for a motion coding based on the comparison of the three SAD's: (i) the 32×16 sub-super block-based SAD and (ii) the 16×32 sub-super block-based SAD that are generated in block 740, and (iii) the 32×32 super block-based SAD that is generated in block 710 (block 750). Motion coding module 210 may select the 32×32 block formation, 32×16 block formation or 16×32 block formation that generates the smallest SAD. If motion coding module 210 determines that the 32×32 super block-based SAD is the smallest among the above-mentioned three SAD's, then motion coding module 210 may determine the 32×32 block formation as a block formation to be used for motion coding. Otherwise, motion coding module 210 may select the 32×16 block formation or the 16×32 block formation as a block formation, depending on which one of the two sub-super block-based SAD is smaller than the other.

Upon checking whether the 32×32 block formation is determined as a block formation in block 760, and if so, texture coding module 220 proceeds to block 770 to determine a block size for texture coding according to the determined 32×32 block formation. Texture coding module 220 may perform a 32×32 texture coding and a 16×16 texture coding for the image data in the 32×32 super block for which the 32×32 block formation is determined. The texture coding may include, but is not limited to, performing a DCT transform, a Hadamard transform, or the like. Texture coding module 220 may perform any variety of entropy coding operations to generate estimated bit streams for the 32×32 texture coding and the 16×16 texture coding. In one embodiment, texture coding module 220 may perform simulated entropy coding for increased efficiency and operation speed. Texture coding module 220 may determine whether to use a 32×32 block size or a 16×16 block size according to the comparison of the amount of the estimated bit streams (block 770). Texture coding module 220 may compare the amounts of bit streams for the 32×32 texture coding and the 16×16 texture coding to thereby select either the 32×32 block size or the 16×16 block size. Texture coding module 220 may determine a block size that can produce the smallest amount of bit streams, e.g., based on a RD optimization (Rate Distortion Optimization) and a simulated trial of the bit streams. If 32×32 texture coding produces the smaller amount of bit streams than that of the 16×16 texture coding, then texture coding module 220 selects the 32×32 block size for the texture coding. If texture coding module 220 determines that the 16×16 block formation is determined as a block formation in block 760, texture coding module 220 proceeds to block 780 to select the 16×16 block size as a block size for real texture coding (e.g., DCT transform). Texture coding module 220 may perform a real texture coding based on the determined block size and perform an entropy coding (e.g., Huffman coding, run-length coding or the like) to generate a real bit steam to be transmitted. It should be understood that any variety of texture coding techniques well-known in the art may be used to perform the above texture coding.

Figure 8:
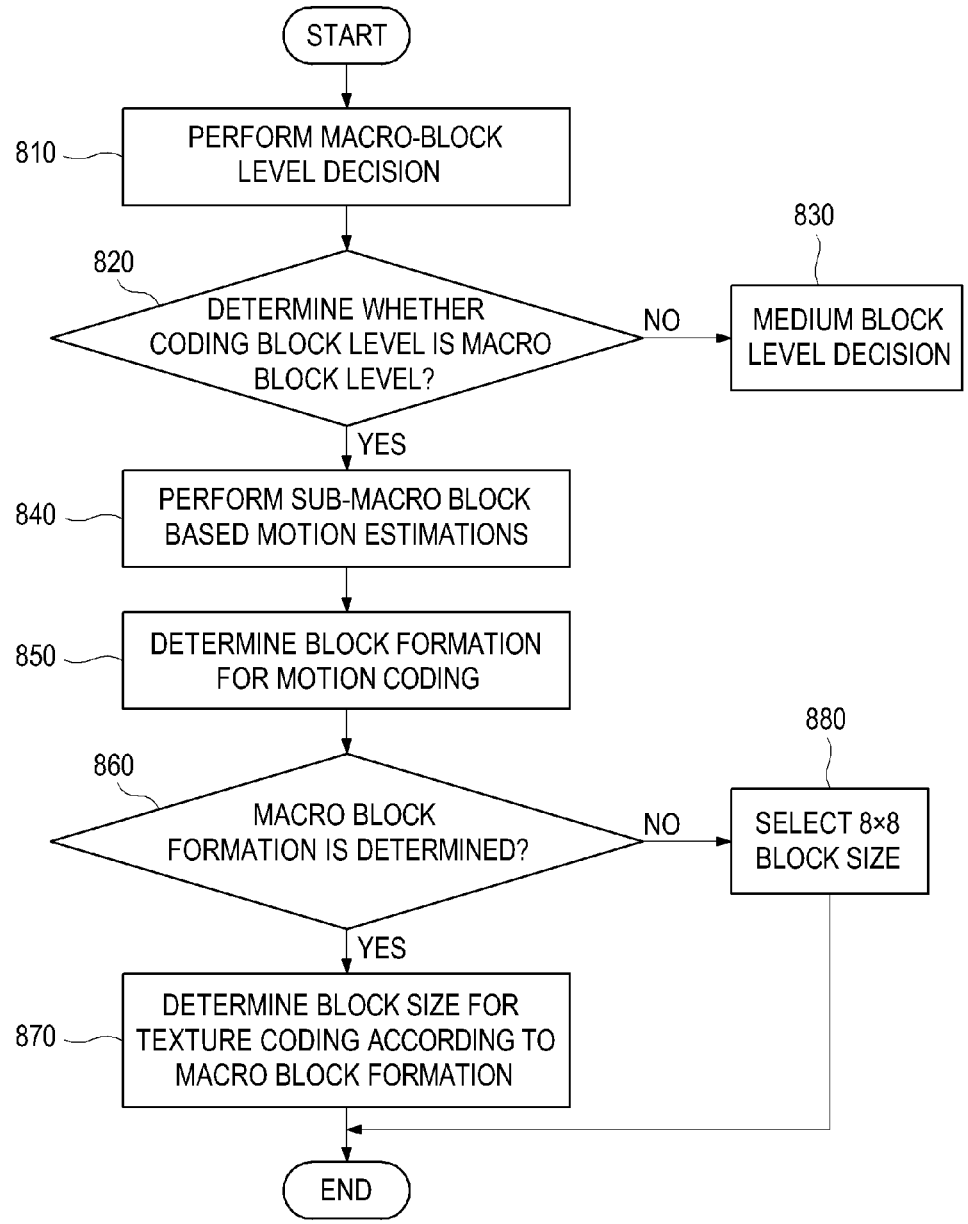
FIG. 8 shows a detailed flow chart of an illustrative embodiment of operations for the second block level decision of FIG. 6.

FIG. 8 shows a detailed flow chart of an illustrative embodiment of operations for the second block level decision of FIG. 6. As mentioned earlier, in block 720 of FIG. 7, if motion coding module 210 determines that the SAD of the super block-based ME is not less than the SAD of the macro block-based ME for the 32×32 super block, motion coding module 210 proceeds to block 810 of FIG. 8. Motion coding module 210 may perform a macro block level decision for the 32×32 super block which is determined to be processed not at a super block level (block 810), in a similar fashion as the super block level decision described above with reference to FIG. 7. Motion coding module 210 may quadrisect the 32×32 super block into four 16×16 macro blocks. For each 16×16 macro block, motion coding module 210 may perform a ME operation in a unit of the 16×16 macro block, and in a unit of four 8×8 medium blocks (i.e., four quadrants of the 16×16 macro block) to determine whether the coding block level of the 16×16 macro block is at a macro block level or not. Motion coding module 210 may compare a SAD of the macro block-based ME and a SAD of the medium block-based ME (block 820). If the SAD of the macro block-based ME is smaller than the SAD of the medium block-based ME, motion coding module 210 proceeds to block 840 to perform two sub-macro block-based MEs (16×8 and 8×16). Motion coding module 210 may compare the three SAD's: (i) the 16×8 sub-macro block-based SAD and (ii) the 8×16 sub-macro block-based SAD that is generated in block 840, and (iii) the 16×16 macro block-based SAD that is determined in block 810 (block 850). Motion coding module 210 may determine a block formation for a motion coding based on the comparison results of block 850 (block 860). Motion coding module 210 may select the 16×16 block formation, the 16×8 block formation or the 8×16 block formation that has the smallest SAD. If texture coding module 220 selects the 16×16 block formation as a block formation for motion coding in block 860, texture coding module 220 proceeds to block 870 to perform a 16×16 texture coding and an 8×8 texture coding to generate estimated bit streams for each of the 16×16 texture coding and the 8×8 texture coding. Texture coding module 220 may determine whether to use a 16×16 block size or an 8×8 block size for a texture coding in a similar manner as described above with reference to FIG. 7 in block 770 (block 870). If texture coding module 220 selects the 16×8 block formation or the 8×16 block formation as a block formation in block 860, texture coding module 220 proceeds to block 880 to select the 8×8 block size as a block size for texture coding (e.g., DCT transform). Texture coding module 220 may perform a real texture coding based on the determined block size and perform an entropy coding (e.g., Huffman coding, run-length coding or the like) to generate a real bit steam to be transmitted.

Figure 9:
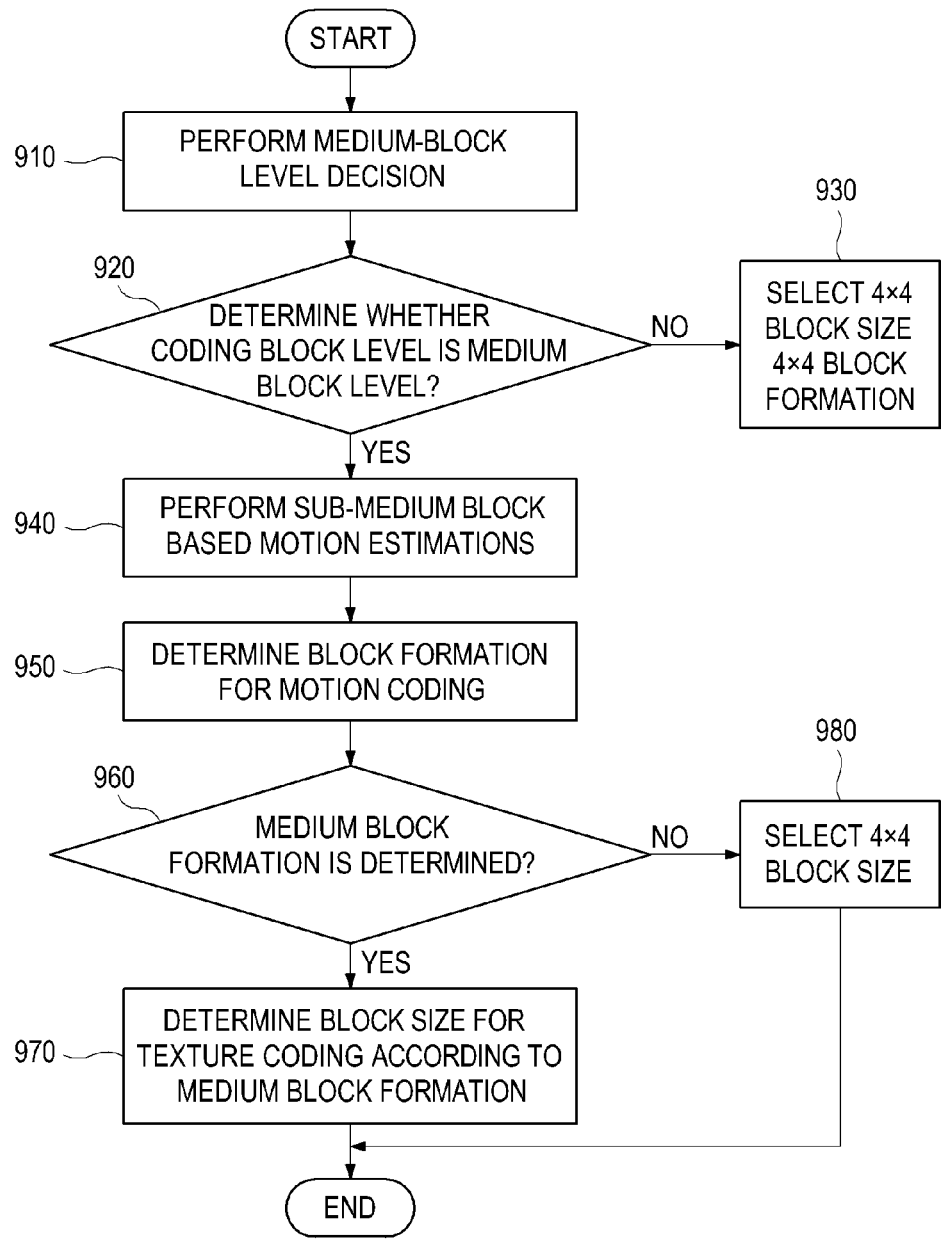
FIG. 9 shows a detailed flow chart of an illustrative embodiment of operations for the third block level decision of FIG. 6.

If the SAD of the macro block-based ME is not smaller than the SAD of the medium block-based ME in block 820 for the 16×16 macro block, motion coding module 210 proceeds to block 910 of FIG. 9 (block 830). Motion coding module 210 may perform a medium block level decision for the 16×16 macro block which is determined not to be processed at a macro block level (block 910), in a similar fashion as the super block level decision described above with reference to FIG. 7. Motion coding module 210 may divide the 16×16 macro block into one or more sub-blocks (e.g., four quadrants of the 16×16 macro block, each quadrant being 8×8 medium block). Motion coding module 210 may perform a ME operation in a unit of a 8×8 medium block, and in a unit of four 4×4 micro blocks to determine whether the 8×8 medium block is to be processed at a medium block level or not. Motion coding module 210 may compare a SAD of the 8×8 medium block-based ME and a SAD of the 4×4 micro block-based ME (block 920). If the SAD of the medium block-based ME is smaller than the SAD of the micro block-based ME, motion coding module 210 proceeds to block 940 to perform two sub-medium block-based MEs (8×4 and 4×8). Otherwise, motion coding module 210 proceeds to block 930 to select the motion formation to be a 4×4 block formation and to select the block size to be a 4×4 block size. Motion coding module 210 may compare the three SAD's: (i) the 8×4 sub-medium block-based SAD and (ii) the 4×8 sub-medium block-based SAD that is generated in block 940, and (iii) the 8×8 medium block-based SAD that is determined in block 910 (block 950). Motion coding module 210 may determine a block formation for motion coding based on the comparison results of block 950 (block 960). Motion coding module 210 may select the 8×8 block formation, the 8×4 block formation or the 4×8 block formation that has the smallest SAD. If texture coding module 220 selects the 8×8 block formation as the block formation for motion coding in block 960, texture coding module 220 proceeds to block 970 to perform an 8×8 simulated texture coding and a 4×4 simulated texture coding to generate estimated bit streams for each of the 8×8 texture coding and the 4×4 texture coding. Texture coding module 220 may determine whether to use an 8×8 block size or a 4×4 block size for texture coding (block 970) in a similar manner as described above with reference to FIG. 7 in block 770. If texture coding module 220 selects the 8×4 block formation or the 4×8 block formation as a block formation in block 960, texture coding module 220 proceeds to block 980 to select the 4×4 block size as the block size for texture coding (e.g., DCT transform). Texture coding module 220 may perform a real texture coding based on the determined block size and perform an entropy coding (e.g., Huffman coding, run-length coding or the like) to generate a real bit steam to be transmitted.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third, and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. An encoding device, comprising:
a motion coding module configured to:
   determine a coding block level, from among a plurality of coding block levels, to process image data of an input frame;
   determine a block formation, from among a plurality of block formations, to motion code the image data according to the determined coding block level; and
   generate motion information in a unit of the determined block formation, wherein the motion information is generated by a performance of a motion estimation operation; and
a texture coding module configured to determine a block size, from among a plurality of block sizes, to texture code residual data that results from the performance of the motion estimation operation according to the determined block formation, to generate a coded bit stream.

2. The encoding device of claim 1, wherein the motion coding module is further configured to:
divide the input frame into a plurality of basic image processing units; and
split, based on a quadtree structure, each of the plurality of basic image processing units recursively, to determine the coding block level.

3. The encoding device of claim 1, wherein the motion information includes at least one of: a motion vector, the residual data, and the block formation.

4. The encoding device of claim 1, wherein the texture coding module is configured to determine the block size to be equal to or smaller than a size of the block formation determined by the motion coding module.

5. The encoding device of claim 4, wherein the texture coding module is configured to determine the block size to be either a 2N×2N block size or a N×N block size, in response to a determination by the motion coding module that the coding block level is a 2N×2N block level and the block formation is a 2N×2N block formation.

6. The encoding device of claim 4, wherein the texture coding module is configured to determine the block size to be a N×N block size, in response to a determination by the motion coding module that the coding block level is a 2N×2N block level and the block formation is at least one block formation different from a 2N×2N block formation.

7. The encoding device of claim 4, wherein the texture coding module is configured to determine the block size to be a N×N block size, in response to a determination by the motion coding module that the coding block level is a 2N×2N block level and the block formation is either a 2N×N sub-block formation or a N×2N sub-block formation.

8. The encoding device of claim 1, further comprising a multiplexer (MUX) configured to multiplex the generated motion information and the generated coded bit stream.

9. A method, comprising:
receiving encoded image data of a current frame;
dividing the current frame into a plurality of basic image processing units;
splitting, by a motion coding module coupled to a processor and based on a quadtree structure, each of the plurality of basic image processing units recursively, to determine a coding block level, from among a plurality of coding block levels, wherein the coding block level is usable to process the image data;

determining, by the motion coding module coupled to the processor, a block formation, from among a plurality of block formations, for a motion coding of the image data according to the determined coding block level, to perform a motion compensation operation in a unit of the determined block formation; and determining, by a texture coding module coupled to the processor, a block size, from among a plurality of block sizes, for a texture coding of the image data according to the determined block formation, wherein the determined block size is used to generate a coded bit stream.

10. The method of claim 9, wherein the block size is determined to be equal to or smaller than a size of the determined block formation.

11. The method of claim 10, wherein determining the block size includes determining the block size to be either a 2N×2N block size or a N×N block size, in response to a determination that the coding block level is a 2N×2N block level and the block formation is a 2N×2N block formation.

12. The method of claim 10, wherein determining the block size includes determining the block size to be a N×N block size, in response to a determination that the coding block level is a 2N×2N block level and the block formation is at least one block formation different from a 2N×2N block formation.

13. The method of claim 10, wherein determining the block size includes determining the block size to be a N×N block size, in response to a determination that the coding block level is a 2N×2N block level and the block formation is either a 2N×N sub-block formation or a N×2N sub-block formation.

14. A non-transitory computer-readable storage medium having computer-executable instructions stored thereon that are executable by a computer to perform or control performance of operations that comprise:

identify image data of an input frame;

determine, by a motion coding module coupled to a processor, a coding block level, from among a plurality of coding block levels, to process the image data;

determine, by the motion coding module coupled to the processor, a block formation, from among a plurality of block formations, for a motion coding of the image data according to the determined coding block level;

determine, by a texture coding module coupled to the processor, a block size, from among a plurality of block sizes, for a texture coding of residual data that results from a performance of a motion estimation operation according to the determined block formation; and generate, by the texture coding module coupled to the processor, a coded bit stream by performance of the texture coding of the residual data in a unit of the determined block size, wherein the performance of the texture coding is based on a discrete cosine transform.

15. The non-transitory computer-readable storage medium of claim 14, wherein the operations further comprise:

perform the motion estimation operation in a portion of the determined block formation, to generate motion information.

16. The non-transitory computer-readable storage medium of claim 15, wherein the operations further comprise:

multiplex the motion information and the coded bit stream.

17. The non-transitory computer-readable storage medium of claim 14, wherein the block size is determined to be equal to or smaller than a size of the determined block formation.

18. The non-transitory computer-readable storage medium of claim 17, wherein the operations to determine the block size includes at least one operation to:

determine the block size to be either a 2N×2N block size or a N×N block size, in response to a determination that the coding block level is a 2N×2N block level and the block formation is a 2N×2N block formation.

19. The non-transitory computer-readable storage medium of claim 17, wherein the operations to determine the block size includes at least one operation to:

determine the block size to be a N×N block size, in response to a determination that the coding block level is a 2N×2N block level and the block formation is at least one block formation different from a 2N×2N block formation.

20. The non-transitory computer-readable storage medium of claim 17, wherein the operations to determine the block size includes at least one operation to:

determine the block size to be a N×N block size, in response to a determination that the coding block level is a 2N×2N block level and the block formation is either a 2N×N sub-block formation or a N×2N sub-block formation.

* * * * *